United States Patent
Chakra et al.

(10) Patent No.: US 8,380,794 B2
(45) Date of Patent: Feb. 19, 2013

(54) GENERATING CONTEXT AWARE DATA AND CONVERSATION'S MOOD LEVEL TO DETERMINE THE BEST METHOD OF COMMUNICATION

(75) Inventors: Al Chakra, Apex, NC (US); Simon P. O'Doherty, Dublin (IE); Stephen A. Davies, Dublin (IE); Brendan Arthurs, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/351,531

(22) Filed: Jan. 9, 2009

(65) Prior Publication Data

US 2010/0179992 A1 Jul. 15, 2010

(51) Int. Cl.
*G06F 15/16* (2006.01)
(52) U.S. Cl. ........ 709/206; 709/204; 709/205; 709/224; 709/225; 709/226; 709/227
(58) Field of Classification Search .......... 709/204–206, 709/224–227
See application file for complete search history.

(56) References Cited

U.S. PATENT DOCUMENTS

| | | | |
|---|---|---|---|
| 5,659,596 A | | 8/1997 | Dunn |
| 6,496,849 B1 * | | 12/2002 | Hanson et al. ................ 709/200 |
| 6,691,153 B1 * | | 2/2004 | Hanson et al. ................ 709/204 |
| 6,782,413 B1 | | 8/2004 | Loveland |
| 6,895,558 B1 | | 5/2005 | Loveland |
| 7,333,976 B1 * | | 2/2008 | Auerbach et al. ..................... 1/1 |
| 2003/0233420 A1 * | | 12/2003 | Stark et al. .................... 709/206 |
| 2004/0057415 A1 | | 3/2004 | Colson et al. |
| 2004/0078447 A1 | | 4/2004 | Malik et al. |
| 2004/0078595 A1 | | 4/2004 | Kent, Jr. et al. |
| 2004/0128356 A1 | | 7/2004 | Bernstein et al. |
| 2005/0055411 A1 | | 3/2005 | Bouchard et al. |
| 2005/0055416 A1 | | 3/2005 | Heikes et al. |
| 2007/0088793 A1 | | 4/2007 | Landsman |
| 2007/0192422 A1 * | | 8/2007 | Stark et al. .................... 709/206 |
| 2008/0046845 A1 * | | 2/2008 | Chandra ....................... 715/856 |
| 2008/0109406 A1 * | | 5/2008 | Krishnasamy et al. ........... 707/3 |
| 2008/0189331 A1 * | | 8/2008 | Lee et al. ................... 707/104.1 |
| 2008/0208994 A1 * | | 8/2008 | Chi et al. ...................... 709/206 |
| 2008/0215692 A1 * | | 9/2008 | Bosarge et al. ............... 709/206 |
| 2008/0270538 A1 * | | 10/2008 | Garg et al. .................... 709/204 |
| 2009/0106415 A1 * | | 4/2009 | Brezina et al. ................ 709/224 |
| 2009/0150397 A1 * | | 6/2009 | Chen et al. ........................ 707/9 |
| 2009/0164598 A1 * | | 6/2009 | Nelson et al. ................. 709/206 |
| 2009/0261157 A1 * | | 10/2009 | Kumar et al. ................. 235/375 |
| 2009/0307313 A1 * | | 12/2009 | Wang et al. ................... 709/206 |
| 2009/0319456 A1 * | | 12/2009 | Consul et al. ................... 706/21 |
| 2009/0319620 A1 * | | 12/2009 | Gross et al. .................. 709/206 |

(Continued)

*Primary Examiner* — Backhean Tiv
(74) *Attorney, Agent, or Firm* — Marcia L. Doubet

(57) ABSTRACT

A method, system and computer-usable medium are disclosed for providing information related to a user address as used in a communication session. A tag processing module is implemented for processing tags related to a user. A first user selects a second user to receive a message to initiate a communication session. The message recipient's tags, along with their preferred communication method(s) are displayed within the message sender's messaging client. The message sender then composes and sends a message to the message recipient, using the message recipient's preferred method of communication. The message is received by the message recipient and the message sender's tags are displayed within the message recipient's messaging client. If the message recipient decides to respond to the message, then a communication session is conducted. Once the communications session is ended, a linguistic analysis of the communication session is performed by the tag processing module. The message sender's tags are then updated.

14 Claims, 6 Drawing Sheets

U.S. PATENT DOCUMENTS

| | | |
|---|---|---|
| 2010/0009653 A1* | 1/2010 | Shkolnikov et al. .......... 455/405 |
| 2010/0064007 A1* | 3/2010 | Randall ......................... 709/204 |
| 2010/0131604 A1* | 5/2010 | Portilla ......................... 709/206 |
| 2010/0179992 A1* | 7/2010 | Chakra et al. ................. 709/206 |
| 2010/0304735 A1* | 12/2010 | Hursey et al. ................. 455/423 |
| 2012/0041903 A1* | 2/2012 | Beilby et al. .................... 706/11 |

* cited by examiner

GENERATING CONTEXT AWARE DATA AND CONVERSATION'S MOOD LEVEL TO DETERMINE THE BEST METHOD OF COMMUNICATION

BACKGROUND OF THE INVENTION

1. Field of the Invention

Embodiments of the disclosure relate in general to the field of computers and similar technologies, and in particular to software utilized in this field. Still more particularly, it relates to a method, system and computer-usable medium for providing information related to a user address as used in a communication session.

2. Description of the Related Art

The widespread adoption of communication technologies such as the Internet and wirelessly-enabled mobile devices now allows workers to communicate with each other from practically anywhere at practically any time. These technologies, which include electronic mail, instant messaging, short messaging service (SMS) messages, wireless voice, and even peer-to-peer video, often contribute to increased productivity. However, their ubiquity and ease of use also provide the opportunity for unplanned interruptions, which may offset any gains in productivity. For some, the level of interruptions in day-to-day life, both professionally and personally, has increased dramatically. As a result, there are times when individuals do not wish to be interrupted except under certain circumstances.

In addition, it is now becoming common for individuals to be given a tag by others in social networking systems. These tags are often used to alert others regarding the individual's skills or areas of interest. This can lead to issues when the individual is repetitively contacted due to their assigned tag. In many cases there is no way the individual can respond to every request or the request comes at an inconvenient time. Another issue is the emotional tone used by some individuals in the course of their communication with others. As an example, an individual may request information in a very demanding way and respond negatively to answers they disagree with. Such experiences can not only be distracting, but counter-productive and demoralizing, especially if they are not expected.

Current approaches to this issue include filters for electronic mail messages and instant messaging sessions, as well as caller identifiers for voice communication. However these approaches are limited in that they are often static or reflect data that may not be consistent with the user's needs. Said another way, they may not offer the flexibility or level of detail for a user to adequately control do-not-disturb messages, email filtering rules, or management of voice mails. As a result, it is often difficult to pre-empt potentially disruptive or contentious communications until a more suitable time or communication venue.

BRIEF SUMMARY OF THE INVENTION

The present invention includes, but is not limited to, a method, system and computer-usable medium for providing information related to a user address as used in a communication session. In various embodiments, a tag processing module is implemented on a messaging system for the processing of tags related to a user. In these embodiments, a first user, the message sender, selects a second user, the message recipient, to receive a message to initiate a communication session. The message sender first retrieves the message recipient's user listing from a communications directory. The message recipient's tags, along with their preferred communication method(s) are then displayed within the message sender's messaging client. The message sender then composes and sends a message to the message recipient, using the message recipient's preferred method of communication.

Once the message is received by the message recipient, the tag processing module retrieves the message sender's listing from the communications directory. Once retrieved, the message sender's tags, associated historical communication times, and historical communication tone are displayed within the message recipient's messaging client. In one embodiment, the tag processing module calculates the associated historical communication times from tags associated with a communication session. In another embodiment, the tag processing module performs linguistic analysis of each communication session to determine a communication tone value, such as positive or negative, which is then averaged with other communication tone values. The averaging of the communication tone values results in the generation of the historical communication tone.

If the message recipient decides to respond to the message, then a communication session is conducted, with the message recipient, the message sender, or both, tagging elements of the communication session. Once the communications session is ended, a linguistic analysis of the communication session is performed by the tag processing module. The message sender's tags are then updated, along with their associated historical communication times and historical communication tone. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
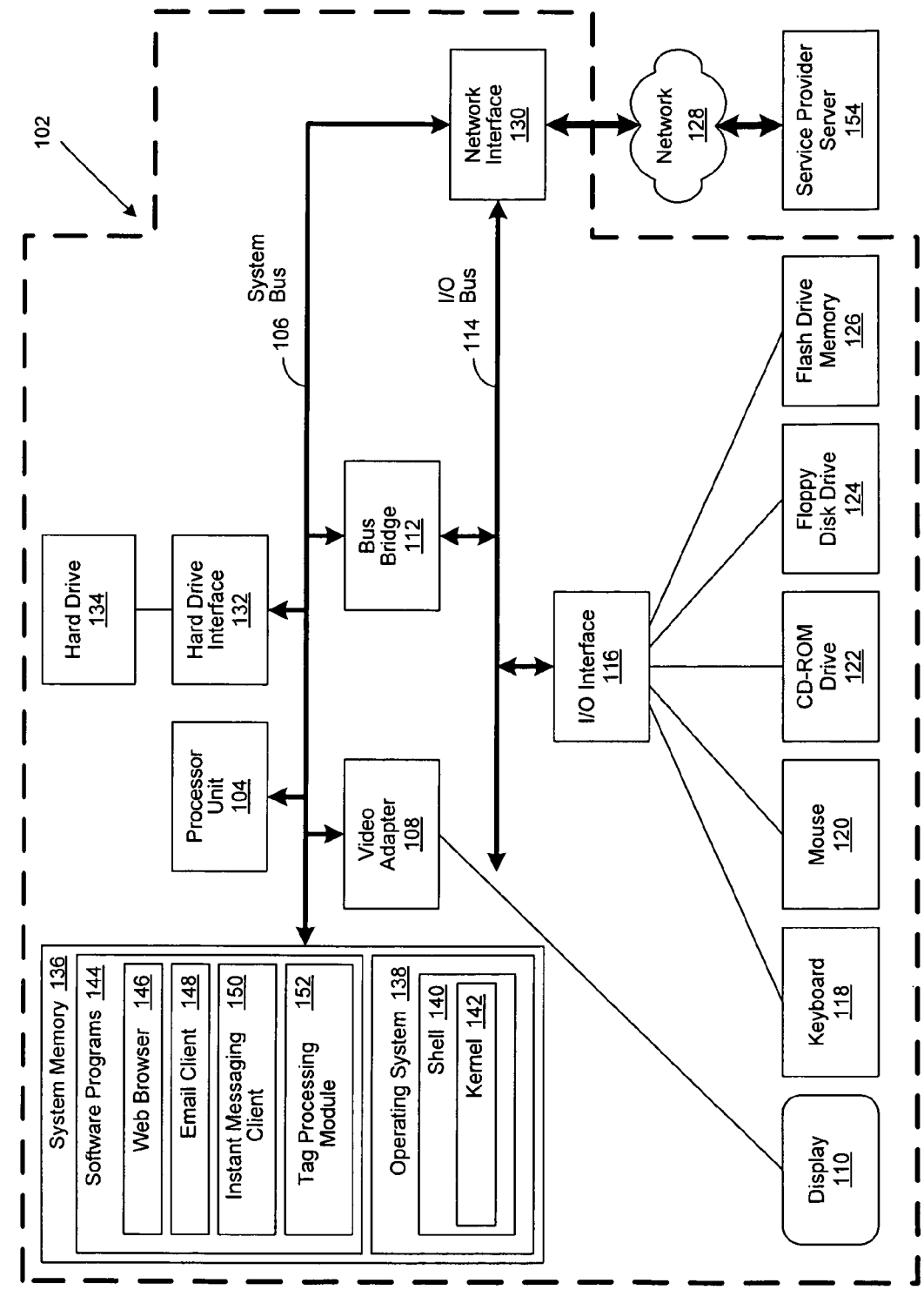
FIG. 1 depicts an exemplary client computer in which the present invention may be implemented.

A method, system and computer-usable medium are disclosed for providing information related to a user address as used in a communication session. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, radio frequency (RF), etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 154 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 154.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a Web browser 146, email client 148, and instant messaging client 150. The Web browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 154. Software programs 144 also include a tag processing module 152. The tag processing module 152 includes code for implementing the processes described in FIGS. 2 through 8 described hereinbelow. In one embodiment, client computer 102 is able to download the tag processing module 152 from a service provider server 154.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
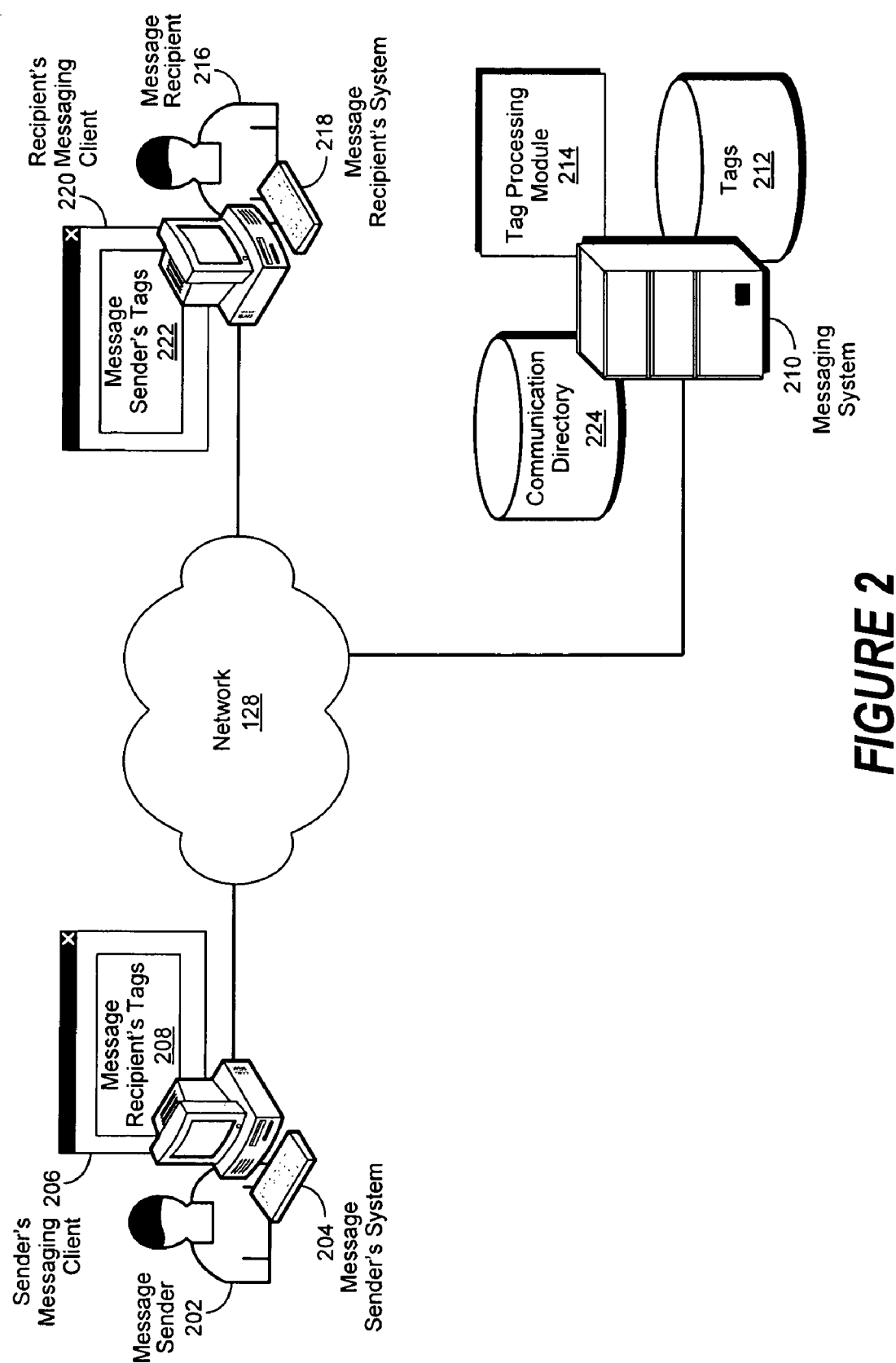
FIG. 2 shows a tag processing module as implemented in an embodiment of the invention.

FIG. 2 shows a tag processing module as implemented in accordance with an embodiment of the invention. In various embodiments, a tag processing module 214 is implemented on a messaging system 210 for the processing of tags 212 related to a user as described in greater detail herein. In these embodiments, a first user, the message sender 202, selects a second user, the message recipient 216, to receive a message to initiate a communication session. As used herein, a communications session may be any form of electronic communication between two or more users. In various embodiments, a communication session may comprise an instant messaging (IM) session, an electronic mail (email) exchange, a text-based electronic pager message, a videoconference, or a telephone conversation. Those of skill in the art will realize that such communication sessions may take many forms and use many different technologies, individually or in combination. As such, the foregoing are not intended to limit the scope, spirit, or intent of the invention.

The message sender 202 uses their system 204 to retrieve the message recipient's 216 user listing from a communications directory 224 coupled to the messaging system 210. The message recipient's tags 208, along with their preferred communication method(s) and any associated auto-message are then displayed within the message sender's messaging client 206. As used herein, an auto-message refers to a message, such as a text message, generated by a recipient of messages to provide additional information related to one or more of their tags.

The message sender 202 then determines whether any of the message recipient's tags 208 are related to the subject of the message. If so, then the message recipient's preferred method of communication is displayed to the message sender 202 within the message sender's messaging client 206. The message sender 202 then uses their system 204 to compose and send a message to the message recipient 216, using the message recipient's preferred method of communication. In one embodiment, the message is sent from the message sender's system 204 to the messaging system 210 over a connection to network 128. The messaging system 210 then delivers the message to the message recipient's system 218, likewise over a connection to network 128.

Once the message is received by the message recipient 216, the tag processing module 214 retrieves the message sender's 202 listing from the communications directory 224. Once retrieved, the message sender's tags 222, associated historical communication times, and historical communication tone are displayed within the message recipient's messaging client 220. As used herein, associated historical communication times refer to the average amount of time the message sender spends communicating about a particular subject related to a tag. In one embodiment, the tag processing module 214 calculates the associated historical communication times from tags associated with a communication session. As likewise used herein, the historical tone of the message sender refers to their average emotional state when communicating about a particular subject related to a tag. In one embodiment, the tag processing module 214 performs linguistic analysis of each communication session to determine a communication tone value, such as positive or negative, which is then averaged with other communication tone values. The averaging of the communication tone values results in the generation of the historical communication tone.

The message recipient 216 then decides whether to respond to the message. If not, then the communication session is ended. Otherwise, the communication session is conducted, with the message recipient 216, the message sender 202, or both, tagging elements of the communication session with tags related to the subject of the communication session. In one embodiment, if a tag is added to the communication session it is likewise added to the user's directory listing if it is not already listed. In another embodiment, the amount of elapsed time between the occurrence of different tags is measured by the tag processing module 214, which associates the measurement with its respective tag. The associated measurement is then used by the tag processing module to calculate the associated historical communication time for each of the tags associated with the communication session. Once the communications session is ended, a linguistic analysis of the communication session is performed by the tag processing module 214 as described in greater detail herein. The message sender's 202 tags are then updated, along with their associated historical communication times and historical communication tone.

Figure 3:
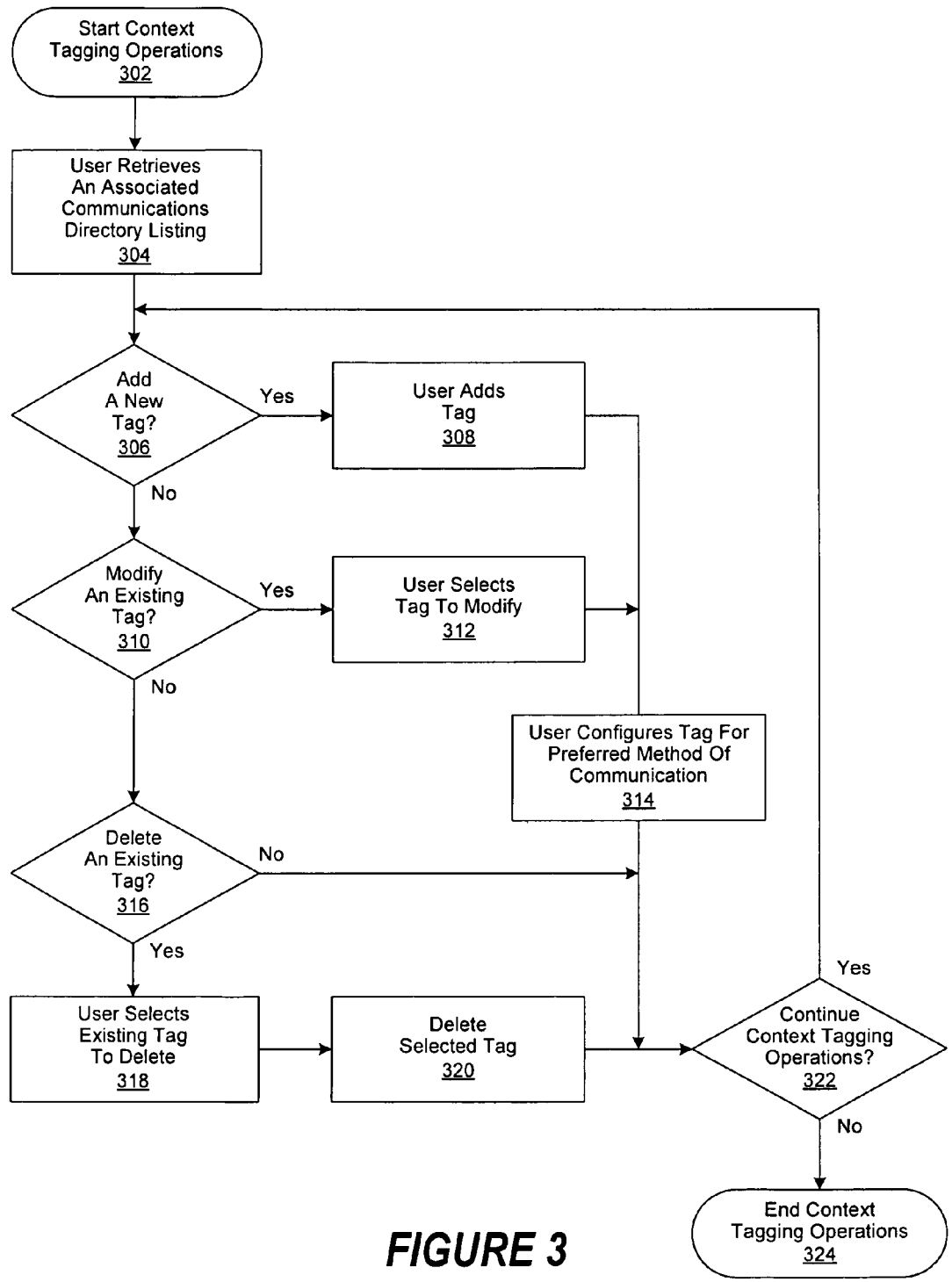
FIG. 3 is a flowchart for performing tagging operations.

FIG. 3 is a flowchart for performing tagging operations as implemented in an embodiment of the invention. In this embodiment, context tagging operations are begun in step 302, followed by a user retrieving their user listing from a communications directory in step 304. In one embodiment, the communications directory is a directory based on the lightweight directory access protocol (LDAP). A determination is then made in step 306 whether a tag is to be added to the user listing. As used herein, a tag refers to metadata, such as a key word or term of usage, associated with information likewise associated with a user, such as a user name, directory listing, or messaging address. Skilled practitioners of the art will realize that a tag may be associated with a wide variety of information that is likewise associated with a user and the foregoing are not intended to limit the spirit, scope, or intent of the invention.

If it is determined in step 306 to add a tag to the directory listing, then the tag is added by the user in step 308. As an example, the user may add the tag "tech-stuff" to their directory listing with a command such as "/tag tech-stuff." In this example, "tech-stuff" is a term of usage that may also be used as a key word in a search of the communications directory for users that possess technical knowledge. However, if it is determined in step 306 to not add a tag, then a determination is made in step 310 whether to modify an existing tag. If so, then an existing tag is selected by the user in step 312. Once a new tag is created in step 308, or an existing tag is selected in step 312, the tag is configured in step 314 to indicate the user's preferred method of communication regarding the subject related to the tag. In one embodiment, the tag is extensible and additional information may be added to the tag by the user. In another embodiment, the tag is cross-referenced to additional information stored in a database. In this embodiment, the tag is used as a key to retrieve the cross-referenced information. It will be appreciated that many such approaches are possible.

As an example, the user may configure an extensible tag "disclosure-updates" to signify that their preferred method of communication regarding patent disclosure updates is by electronic mail (email) messages. The user may further configure the extensible tag "disclosure-updates" to signify that they will typically respond to such email messages for example in the afternoon between 3:00 PM and 5:00 PM local time. Likewise, the user may add a comment to the extensible tag that they may be contacted via their pager in case of an emergency related to a patent disclosure update. However, if it is determined in step 310 not to modify an existing tag, then a determination is made in step 316 whether to delete an existing tag. If so, then the user selects an existing tag in step 318, followed by the deletion of the selected tag in step 320. Once the tag has been configured in step 314, or if it was determined in step 316 not to delete an existing tag, or if an existing tag was deleted in step 320, a determination is made in step 322 whether to continue context tagging operations. If so, then the process continues, proceeding with step 306. Otherwise, context tagging operations are ended in step 324.

Figure 4:
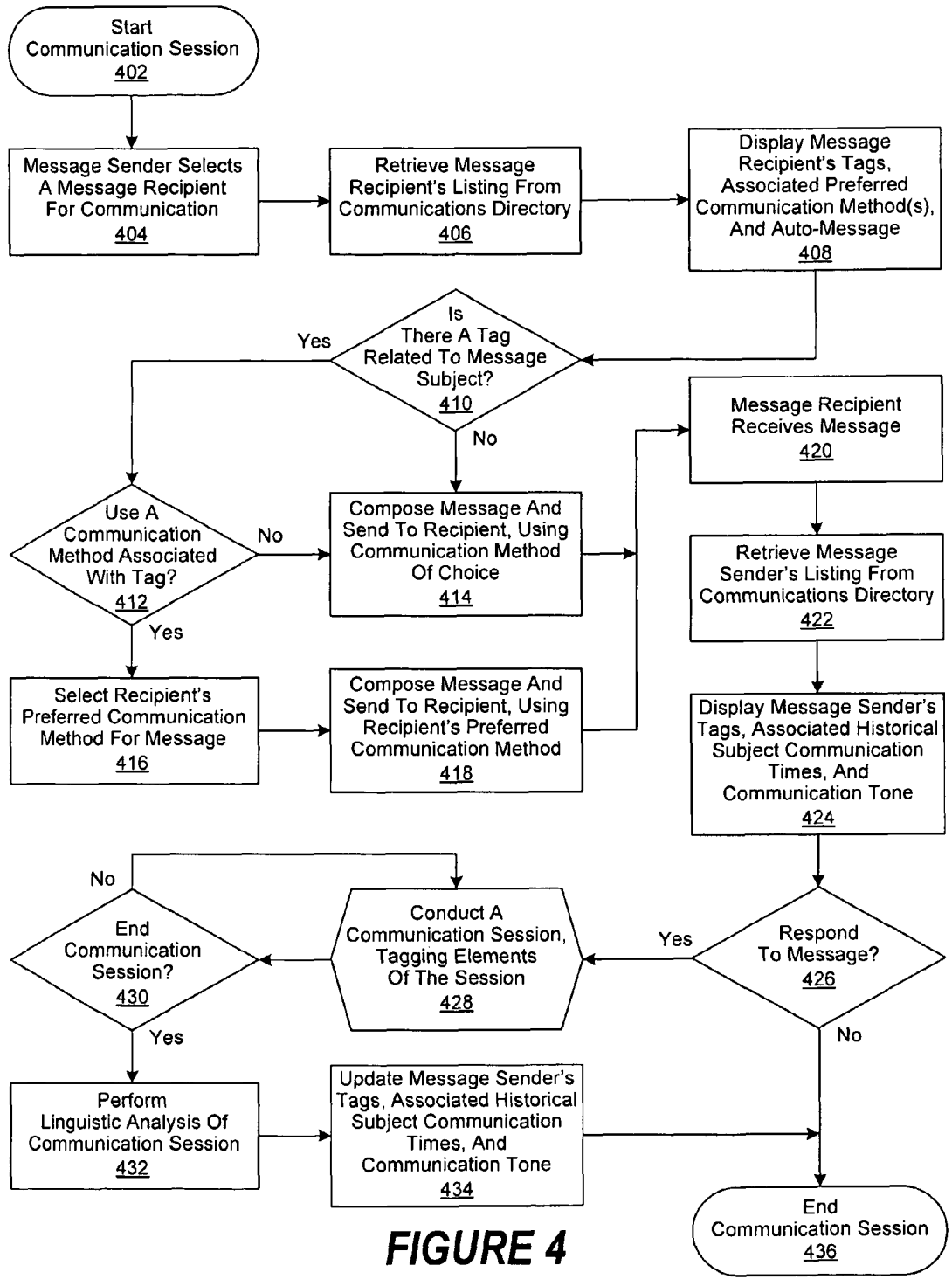
FIG. 4 is a flowchart for using tags for the initiation of a communication session.

FIG. 4 is a flowchart for using tags as implemented in an embodiment of the invention for the initiation of a communication session. In various embodiments, a tag processing module is implemented for the processing of tags related to a user as described in greater detail herein. In this embodiment, a communications session is initiated in step 402. As used herein, a communications session may be any form of electronic communication between two or more users. In various embodiments, a communication session may comprise an instant messaging (IM) session, an electronic mail (email) exchange, a text-based electronic pager message, a videoconference, or a telephone conversation. Those of skill in the art will realize that such communication sessions may take many forms and use many different technologies, individually or in combination. As such, the foregoing are not intended to limit the scope, spirit, or intent of the invention.

In step 404, a first user, hereinbelow the "message sender," selects a second user, likewise hereinbelow the "message recipient," to receive a message to initiate a communication session. In step 406, the message sender retrieves the message recipient's user listing from a communications directory. The message recipient's tags, along with their preferred communication method(s) and any associated auto-message are then displayed within the message sender's messaging client in step 408. As used herein, an auto-message refers to a message, such as a text message, generated by a recipient of messages to provide additional information related to one or more of their tags. As an example, the message recipient may possess extensive knowledge of the Sun Certified Java Programmer (SCJP) curriculum and associated resources. To avoid repetitive inquiries regarding SCJP certification exams, the message recipient may add an auto-message to a tag "scjp" stating that any inquiries related to SCJP exams be referred to an SCJP user forum.

A determination is then made in step 410 whether there is a tag related to the subject of the message. In one embodiment, the tag processing module determines whether the message sender has generated tags related to the message recipient, and if so, the tags are displayed within the message sender's messaging client. In another embodiment, the message sender has not generated tags related to the message recipient and the tag processing module displays tags generated by the message recipient within the message sender's messaging client. In yet another embodiment, the tag processing module determines which tags are related to the most common message subjects between the message sender and the message recipient. In still another embodiment, the tag processing module determines if the message sender's current messaging client supports the message recipient's preferred method of communication for the subject related to the tag. If so, then the tag and the message recipient's preferred method of communication are not displayed to the message sender. These tags, whether generated by the message sender or the message recipient, are then displayed within the message sender's messaging client.

If it is determined in step 410 that there is a tag associated with the subject of the message, then a determination is made in step 412 whether to use the message recipient's preferred method of communication for the subject. If not, or if it was determined in step 410 that there was no tag related to the subject of the message, then the message sender composes and sends a message to the message recipient in step 414, using an alternative method of communication. However, if it was determined in step 412 to use the message recipient's preferred method of communication, then the message recipient's preferred method of communication is selected in step 416. In one embodiment, the tag processing module automatically determines the message recipient's preferred method of communication for the subject related to the tag. If the message sender's current messaging client does not support the preferred method of communication, then the tag processing module automatically switches the sender's current messaging client to a messaging client that does. The message sender then composes and sends a message to the message recipient in step 418, using the message recipient's preferred method of communication. Once the message is composed and sent using an alternative method of communication in step 414, or the message recipient's preferred method in step 418, the message is received by the message recipient in step 420.

Once the message is received by the message recipient, the tag processing module retrieves the message sender's listing from the communications directory in step 422. Once retrieved, the message sender's tags, associated historical communication times, and historical communication tone are displayed within the message recipient's messaging client in step 424. As used herein, associated historical communication times refer to the average amount of time the message sender spends communicating about a particular subject related to a tag. In one embodiment, the tag processing module calculates the associated historical communication times from tags associated with a communication session. As likewise used herein, the historical tone of the message sender refers to their average emotional state when communicating about a particular subject related to a tag. In one embodiment, the tag processing module performs linguistic analysis of each communication session to determine a communication tone value, such as positive or negative, which is then averaged with other communication tone values. The averaging of the communication tone values results in the generation of the historical communication tone. In one embodiment, the historical communication tone values is represented as a tag associated with the user, such as "tone+", "tone−", "tone-positive", or "tone-negative".

A determination is then made in step 426 whether the message recipient responds to the message. If not, then the communication session is ended in step 436. Otherwise, the communication session is conducted in step 428, with the message recipient, the message sender, or both, tagging elements of the communication session with tags related to the subject of the communication session. In one embodiment, if a tag is added to the communication session it is likewise added to the user's directory listing if it is not already listed. In another embodiment, the amount of elapsed time between the occurrence of different tags is measured by the tag processing module, which associates the measurement with its respective tag. The associated measurement is then used by the tag processing module to calculate the associated historical communication time for each of the tags associated with the communication session.

A determination is then made in step 430 whether to end the communication session. If not, then the process continues, proceeding with step 428. Otherwise a linguistic analysis of the communication session is performed by the tag processing module in step 432 as described in greater detail herein. The message sender's tags are then updated in step 434, along with their associated historical communication times, and historical communication tone. The communication session is then ended in step 436.

Figure 5:
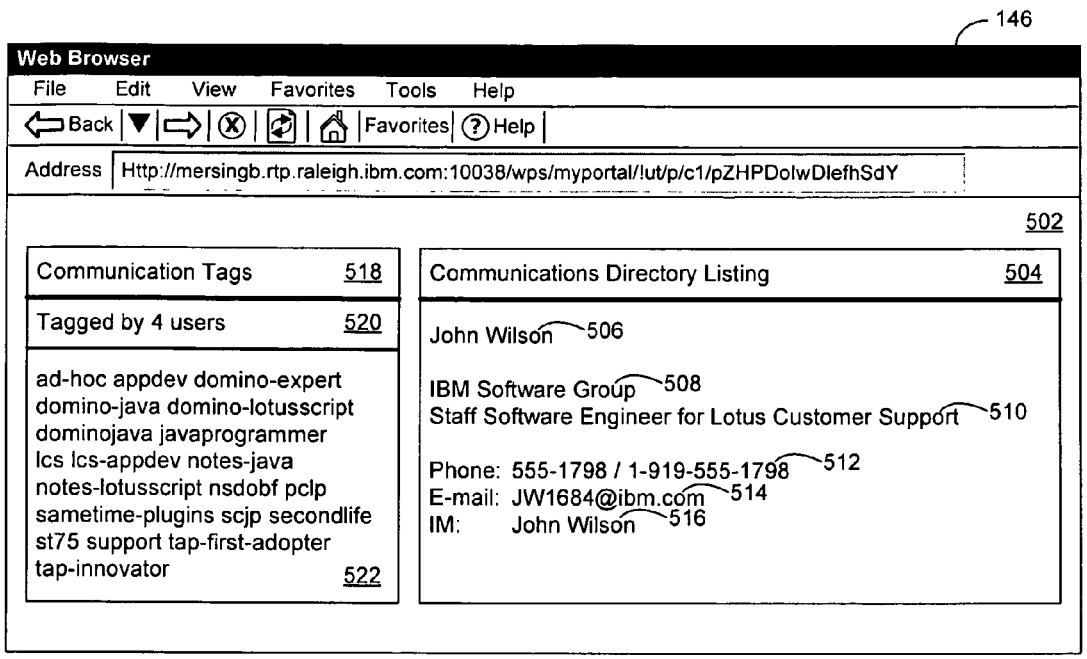
FIG. 5 is a simplified communications directory listing comprising tags associated with a user as displayed within a user interface window of a Web browser.

FIG. 5 is a simplified communications directory listing comprising tags associated with a user as displayed within a user interface window of a Web browser. In an embodiment of the invention, a communications directory listing 504 of a user is displayed within a user interface (UI) window 502 of a Web browser 146. In one embodiment, the communications directory is a directory based on the lightweight directory access protocol (LDAP). The communications directory listing 504 comprises the name 506 of the user, the corporate division 508 they are assigned to, as well as their job title 510, their telephone number 512, their email address 514, and their instant messaging address 516. Likewise displayed within the UI window 502 is communication tags 518 window, comprising individual tags 522 associated with the communications directory listing 504 that have been entered by four users 520.

As used herein, a tag refers to metadata, such as a key word or term of usage, associated with information likewise associated with a user, such as a user name, directory listing, or messaging address. Skilled practitioners of the art will realize that a tag may be associated with a wide variety of information that is likewise associated with a user and the foregoing are not intended to limit the spirit, scope, or intent of the invention. As an example, the individual tag "domino-expert" may have been added to the individual tags 522 by a user to indicate that the user "John Wilson" 506 is an expert on the Domino server. As another example, the tag "notes Java" may indicate that the user "John Wilson" 506 is a knowledge resource regarding the use of the Java programming language in Lotus Notes. In various embodiments, the individual tags 522 may have been entered by their associated user "John Wilson" 506, or by other users. In one embodiment, the user "John Wilson" 506 can modify or delete individual tags 522 through user gestures within the communication tags window 518.

Figure 6:
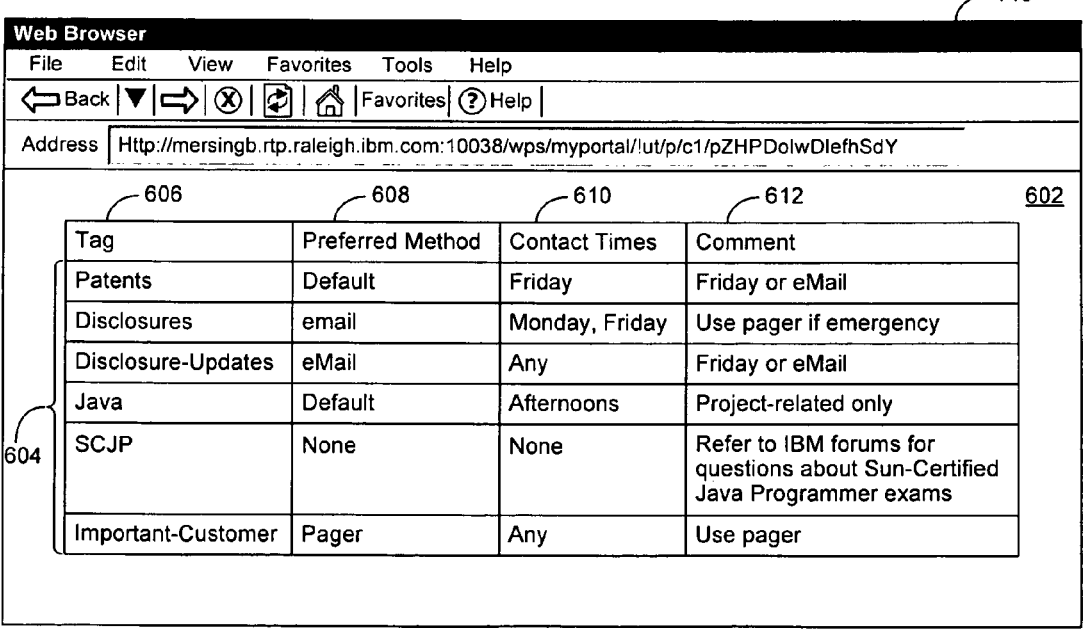
FIG. 6 shows tags associated with a user as displayed within a user interface window of a Web browser.

FIG. 6 shows tags associated with a user as displayed within a user interface window of a Web browser. In an embodiment of the invention, additional information associated with individual tags 604, each of which in turn is associated with a user, is displayed within a user interface (UI) window 602 of a Web browser 146. In one embodiment, the additional information comprises the tag 606, the user's preferred method of communication 608 regarding the subject related to the tag, their preferred time of contact 610, and any associated comments 612. In one embodiment, each of the individual tags 604 are extensible and additional information 608, 610, 612 may be added or modified by the user. In another embodiment, the tag is cross-referenced to additional information stored in a database. In this embodiment, the tag is used as a key to retrieve the cross-referenced information. It will be appreciated that many such approaches are possible.

As an example, the user may configure an extensible tag 606 "disclosures" to signify that their preferred method 608 of communication regarding patent disclosures is by electronic mail (email) messages. The user may further configure the extensible tag "disclosures" to signify that their preferred contact times 610 are Mondays or Fridays. Likewise, the user may add a comment 612 to the extensible tag that they may be contacted via their pager in case of an emergency related to a patent disclosure. In one embodiment, the user can modify or delete individual tags 604 through user gestures within the UI window 602.

Figure 7:
FIG. 7 shows tags associated with a user as displayed within a user interface window of an instant messaging client.

FIG. 7 shows tags associated with a user as displayed within a user interface window of an instant messaging client. In an embodiment of the invention, additional information associated with a subset of individual tags 724, each of which in turn is associated with a user 704, is displayed within a user interface (UI) window 702 of an Instant Messaging (IM) client 150. The IM client 150 comprises a user directory listing window 702, further comprising a message recipient's IM address 704, their job title 706, their email address 708, their telephone number 710, and an alert message 712. The IM client further comprises a message recipient response window 722 and a tags window 724. The tags window 724 further comprises tags 'patents' 726, 'disclosures' 728, 'important-customer' 730, 'weather' 732, and 'tech-stuff' 734.

In this embodiment, a message sender selects a message recipient 704 to receive a message to initiate a communication session. The message sender retrieves the message recipient's 704 user listing from a communications directory. The message recipient's 704 tags 718, along with their preferred communication method(s) 720 and any associated auto-message 714 are then displayed within a UI window 702 of the message sender's IM client 150. As used herein, an auto-message 714 refers to a message, such as a text message, generated by a recipient of messages to provide additional information related to one or more of their tags. As an example, the message recipient may wish to alert a message sender that IM messages relating to certain tags 718 may not be responded to in a timely manner. As shown in FIG. 7, the message recipient's preferred method of communication 720 is displayed respectively with each of the corresponding tags 718.

In one embodiment, a tag processing module is implemented to determine whether the message sender has generated tags related to the message recipient, and if so, the individual tags 726, 728, 730, 732, and 734 are displayed within the tags window 724. In another embodiment, the message sender has not generated tags related to the message recipient and the tag processing module displays the individual tags 726, 728, 730, 732, and 734 generated by the message recipient within the tags window 724. In yet another embodiment, the tag processing module determines which tags are related to the most common message subjects between the message sender and the message recipient and displays them as tags 718 within the UI window 716. In still another embodiment, the tag processing module determines if the message sender's current messaging client supports the message recipient's preferred method of communication for the subject related to the tag. If so, then the tag and the message recipient's preferred method of communication are not displayed to the message sender. These tags, whether generated by the message sender or the message recipient, are then displayed within the message sender's messaging client.

In one embodiment, the tag processing module automatically determines the message recipient's preferred method of communication for the subject related to the tag. If the message sender's current messaging client does not support the preferred method of communication, then the tag processing module automatically switches the sender's current messaging client to a messaging client that does. As an example, the message sender may initiate a communication session with their IM client 150, but the message recipient's preferred method of communication 720 for the subject related to the tag 718 is email. If so, then the tag processing module automatically switches the sender from their IM client to their email client.

Figure 8:
FIG. 8 shows tags associated with a user as displayed within a user interface window of an electronic mail client.

FIG. 8 shows tags associated with a user as displayed within a user interface window of an electronic mail client. In an embodiment of the invention, additional information associated with a tag, which in turn is associated with a message sender 804, is displayed within a user interface (UI) window 802 of an electronic mail (email) client 148. The UI window 802 comprises a message 828 from the message sender 826. The email client 148 comprises a user directory listing window 802, further comprising a message sender's IM address 804, their job title 806, their email address 808, their telephone number 810, and an alert message 812. The email client further comprises a message recipient response window 830 and a tags window 832. The tags window 832 further comprises tags 'patents' 834, 'disclosure-updates' 836, and 'important-customer' 830.

In this embodiment, a message recipient receives a message from a message sender 804 to initiate a communication session. The message receiver retrieves the message sender's 804 user listing from a communications directory. The message sender's 804 tags 818, along with their respective historical communication times 820, historical communication tone 824, and any associated auto-message 814 are then displayed within a UI window 816 of the message recipient's email client 146. As used herein, an auto-message 814 refers to a message, such as a text message, generated by a sender of a message to provide additional information related to one or more of their tags. As an example, the message recipient may wish to alert a message recipient of the historical communication times 820 and historical communication tone 824 associated with the message sender 804.

As used herein, historical communication times refer to the average amount of time a message sender spends communicating about a particular subject related to a tag. In one embodiment, the tag processing module calculates the associated historical communication times 820 from tags associated with a communication session. As likewise used herein, the historical tone of the message sender refers to their average emotional state when communicating about a particular subject related to a tag. In one embodiment, the tag processing module performs linguistic analysis of each communication session to determine a communication tone value 828, such as positive or negative, which is then averaged with other communication tone values. The averaging of the communication tone values results in the generation of the historical communication tone.

In one embodiment, a tag processing module is implemented to determine whether the message recipient has generated tags related to the message sender, and if so, the individual tags 834, 836, and 838 are displayed within the tags window 832. In another embodiment, the message recipient has not generated tags related to the message sender and the tag processing module displays the individual tags 834, 836, and 838 generated by the message sender within the tags window 832. In yet another embodiment, the tag processing module determines which tags are related to the most common message subjects between the message sender and the message recipient and displays them as tags 834, 836, and 838 within the tags window 832.

By reviewing the message sender's 804 tags 818, along with their respective historical communication times 820, historical communication tone 824, and any associated auto-message 814, the message recipient can decide whether to respond to the message. If not, then the communication session is ended. Otherwise, the communication session is conducted with the message recipient, the message sender, or both, tagging elements of the communication session with tags related to the subject of the communication session. In one embodiment, if a tag is added to the communication session it is likewise added to the user's directory listing if it is not already listed. In another embodiment, the amount of elapsed time between the occurrence of different tags is measured by the tag processing module, which associates the measurement with its respective tag. The associated measurement is then used by the tag processing module to calculate the associated historical communication time for each of the tags associated with the communication session.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implementable method for providing information related to a user address, comprising:
   selecting, by a message sender, a message recipient for a message;
   retrieving, for display on a client of the message sender, first previously-stored information associated with a user address of the message recipient, the first previously-stored information comprising: at least one tag; for each of the at least one retrieved tag, a preferred communication method; and any associated auto-message;
   creating the message, by the message sender;
   transmitting the message to the message recipient; and
   responsive to receiving the transmitted message at the message recipient, performing:
      retrieving, for display on a client of the message recipient, second previously-stored information associated with a user address of the message sender, the second previously-stored information comprising: at least one tag; for each of the at least one retrieved tag, a historical amount of communication time; and for each of the at least one retrieved tag, a historical tone of communication, wherein the historical tone of communication, for each of the at least one tag in the second previously-stored information, is associated with communications of the message sender in a plurality of messages with which the tag is associated and is determined by performing linguistic analysis on the plurality of messages with which the tag is associated.

2. The method of claim 1, wherein: at least one of the at least one tag in the first previously-stored information matches a first tag associated with a subject of the message; and the transmitting uses the preferred communication method for the matching tag.

3. The method of claim 1, wherein: at least one of the at least one tag in the second previously-stored information matches a first tag associated with a subject of the message; and the historical amount of communication time for the matching tag is an average amount of time the message sender communicates on subjects with which the matching tag is associated.

4. The method of claim 3, wherein the historical average amount of time is calculated by computing an average time spent by the message sender on messages tagged with the matching tag.

5. A system comprising:
   a processor;
   a data bus coupled to the processor; and
   a computer-usable medium embodying computer program code, the computer-usable medium being coupled to the data bus, the computer program code comprising instructions executable by the processor and configured for:
   selecting, by a message sender, a message recipient for a message;
   retrieving, for display on a client of the message sender, first previously-stored information associated with a user address of the message recipient, the first previously-stored information comprising: at least one tag; for each of the at least one retrieved tag, a preferred communication method; and any associated auto-message;
   creating the message, by the message sender;
   transmitting the message to the message recipient; and
   responsive to receiving the transmitted message at the message recipient, performing:
      retrieving, for display on a client of the message recipient, second previously-stored information associated with a user address of the message sender, the second previously-stored information comprising: at least one tag; for each of the at least one retrieved tag, a historical amount of communication time; and for each of the at least one retrieved tag, a historical tone of communication, wherein the historical tone of communication, for each of the at least one tag in the second previously-stored information, is associated with communications of the message sender in a plurality of messages with which the tag is associated and is determined by performing linguistic analysis on the plurality of messages with which the tag is associated.

6. The system of claim 5, wherein: at least one of the at least one tag in the first previously-stored information matches a first tag associated with a subject of the message; and the transmitting uses the preferred communication method for the matching tag.

7. The system of claim 5, wherein: at least one of the at least one tag in the second previously-stored information matches a first tag associated with a subject of the message; and the historical amount of communication time for the matching tag is an average amount of time the message sender communicates on subjects with which the matching tag is associated.

8. The system of claim 7, wherein the historical average amount of time is calculated by computing an average time spent by the message sender on messages tagged with the matching tag.

9. A non-transitory computer-usable medium embodying computer program code, the computer program code comprising computer executable instructions configured for:
   selecting, by a message sender, a message recipient for a message;
   retrieving, for display on a client of the message sender, first previously-stored information associated with a user address of the message recipient, the first previously-stored information comprising: at least one tag; for each of the at least one retrieved tag, a preferred communication method; and any associated auto-message;
   creating the message, by the message sender;
   transmitting the message to the message recipient; and
   responsive to receiving the transmitted message at the message recipient, performing:
      retrieving, for display on a client of the message recipient, second previously-stored information associated with a user address of the message sender, the second previously-stored information comprising: at least one tag; for each of the at least one retrieved tag, a historical amount of communication time; and for each of the at least one retrieved tag, a historical tone of communication, wherein the historical tone of communication, for each of the at least one tag in the second previously-stored information, is associated with communications of the message sender in a plurality of messages with which the tag is associated and is determined by performing linguistic analysis on the plurality of messages with which the tag is associated.

10. The non-transitory computer usable medium of claim 9, wherein: at least one of the at least one tag in the first previously-stored information matches a first tag associated with a subject of the message; and the transmitting uses the preferred communication method for the matching tag.

11. The non-transitory computer usable medium of claim 9, wherein: at least one of the at least one tag in the second previously-stored information matches a first tag associated with a subject of the message; and the historical amount of communication time for the matching tag is an average amount of time the message sender communicates on subjects with which the matching tag is associated.

12. The non-transitory computer usable medium of claim 11, wherein the historical average amount of time is calculated by computing an average time spent by the message sender on messages tagged with the matching tag.

13. The non-transitory computer usable medium of claim 9, wherein the computer executable instructions are deployable to the client of the message sender and the client of the message recipient from a server at a remote location.

14. The non-transitory computer usable medium of claim 9, wherein the computer executable instructions are provided by a service provider to a customer at the message sender and a customer at the message recipient on an on-demand basis.

* * * * *